(12) United States Patent
Tsukuda et al.

(10) Patent No.: US 10,367,207 B2
(45) Date of Patent: Jul. 30, 2019

(54) FUEL CELL STACK INCLUDING A PLURALITY OF FUEL CELLS AND METHOD OF MANUFACTURING THE SAME

(71) Applicant: MITSUBISHI HITACHI POWER SYSTEMS, LTD., Yokohama-shi, Kanagawa (JP)

(72) Inventors: Hiroshi Tsukuda, Tokyo (JP); Yasuhiko Tsuru, Tokyo (JP); Kenichi Hiwatashi, Kanagawa (JP); Shin Yoshida, Kanagawa (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 551 days.

(21) Appl. No.: 14/865,284

(22) Filed: Sep. 25, 2015

(65) Prior Publication Data

US 2016/0097137 A1    Apr. 7, 2016

(30) Foreign Application Priority Data

Oct. 3, 2014    (JP) .................. 2014-205013

(51) Int. Cl.
| | |
|---|---|
| *H01M 8/02* | (2016.01) |
| *H01M 8/0217* | (2016.01) |
| *C25B 13/04* | (2006.01) |
| *H01M 8/2465* | (2016.01) |
| *C25B 9/08* | (2006.01) |
| *H01M 8/124* | (2016.01) |

(52) U.S. Cl.
CPC ............ *H01M 8/0217* (2013.01); *C25B 9/08* (2013.01); *C25B 13/04* (2013.01); *H01M 8/2465* (2013.01); *H01M 2008/1293* (2013.01); *H01M 2300/0074* (2013.01); *Y02P 70/56* (2015.11)

(58) Field of Classification Search
None
See application file for complete search history.

(56) References Cited

U.S. PATENT DOCUMENTS

2006/0127726 A1*  6/2006  Wang .................. C01F 17/0018
                                                      429/495
2012/0258241 A1* 10/2012  Tucker ..................... H01B 1/22
                                                       427/77

FOREIGN PATENT DOCUMENTS

| JP | 11-191420 A | 7/1999 |
|---|---|---|
| JP | 3553378 B2 | 8/2004 |
| JP | 2005-243528 A | 9/2005 |
| JP | 2012-043638  * | 3/2012 ............. H01M 4/86 |

(Continued)

*Primary Examiner* — Ula C Ruddock
*Assistant Examiner* — Tony S Chuo
(74) *Attorney, Agent, or Firm* — Westerman, Hattori, Daniels & Adrian, LLP

(57) ABSTRACT

A fuel cell stack 101 includes a plurality of fuel cells 105 in which a fuel electrode 109, a solid oxide electrolyte 111, and an air electrode 113 are sequentially laminated, an interconnector 107 that electrically connects the fuel cells 105 which are adjacent to each other, and an interconnector connecting layer 108 that is interposed directly between the air electrode 113 and the interconnector 107. The interconnector connecting layer 108 is formed from a material, which is expressed by a composition formula of $(La_{1-x-y}Sr_xCa_y)_zMnO_3$-Appm-$SiO_2$-DppmMgO (provided that, $0<x\le0.4$, $0<y\le0.4$, $0.1\le x+y\le0.5$, $0.95\le z<1$, A: 10 to 300, D: 10 to 400), through firing.

5 Claims, 3 Drawing Sheets

(56) References Cited

FOREIGN PATENT DOCUMENTS

| JP | 5222011 B2 | 6/2013 |
|---|---|---|
| JP | 2013-140737 A | 7/2013 |

* cited by examiner

FUEL CELL STACK INCLUDING A PLURALITY OF FUEL CELLS AND METHOD OF MANUFACTURING THE SAME

TECHNICAL FIELD

The present invention relates to a fuel cell stack and a method of manufacturing the same, a fuel cell module, a high-temperature water vapor electrolysis cell stack, and a method of manufacturing the same.

BACKGROUND ART

As a fuel cell, a solid oxide fuel cell (SOFC) is known (refer to Patent Document 1). The SOFC includes a plurality of fuel cells, each including a fuel electrode, a solid oxide electrolyte, and an air electrode. The fuel cells, which are adjacent to each other, are electrically connected through an interconnector, and this configuration is called a fuel cell stack.

A fuel cell stack of a tubular lateral stripe type SOFC described in Patent Document 1 is typically prepared as follows. Substrate/a fuel electrode/a solid oxide electrolyte/an interconnector are fired in combination with each other to obtain a co-sintered body, a material of an air electrode is formed in a layer on the co-sintered body, and the resultant laminated body is fired.

In the tubular lateral stripe type SOFC described in Patent Document 1, the fuel electrode is constituted by a material in which nickel and a zirconia-based electrolyte material such as yttria stabilized zirconia (YSZ) are mixed with each other. In the solid oxide electrolyte, YSZ is mainly used. The air electrode is constituted by a material in which a conductive perovskite type oxide expressed by $La_{1-x}Sr_xMnO_3$ and a zirconia-based electrolyte material are mixed with each other. The interconnector is constituted by a conductive perovskite type oxide such as $SrTiO_3$-based oxide which is expressed by $M_{1-x}L_xTiO_3$ (M represents an alkali-earth metal element, L represents a lanthanoid element), and is formed in a dense film in order for a fuel gas and air not to be mixed with each other.

In addition to low conductivity, the $SrTiO_3$-based interconnector material has a problem in that since contact resistance between the interconnector and the air electrode is large, a cell resistance increases, and an output decreases. In Patent Document 1, a contact resistance improving film is provided between the interconnector and the air electrode to reduce the contact resistance between the interconnector and the air electrode.

RELATED ART DOCUMENT

Patent Document

[Patent Document 1] Japanese Patent No. 5222011 (Claim 1)

DISCLOSURE OF THE INVENTION

Problem that the Invention is to Solve

In Patent Document 1, the contact resistance between the interconnector and the air electrode can be reduced, but there is a room for improvement in durability and thermal cycle resistance.

The invention has been made in consideration of the above-described circumstances, and an object thereof is to provide a fuel cell stack and a fuel cell module which are capable of realizing satisfactory power generation performance, durability, and thermal cycle resistance, and a method of manufacturing the same.

Means for Solving the Problems

To solve the above-described problem, a fuel cell stack and a method of manufacturing the same, a fuel cell module, a high-temperature water vapor electrolysis cell stack, and a method of manufacturing the same according to the invention employ the following configurations.

According to an aspect of the invention, there is provided a fuel cell stack including: a plurality of fuel cells in which a fuel electrode, a solid oxide electrolyte, and an air electrode are sequentially laminated; an interconnector that electrically connects the fuel cells which are adjacent to each other; and an interconnector connecting layer that is interposed directly between the air electrode and the interconnector. The interconnector connecting layer is formed from a material, which is expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z\leq1$, A: 10 to 300, D: 10 to 400), through firing.

It is preferable that the interconnector connecting layer is formed from a material, which is expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 100 to 300, D: 100 to 400), through firing.

In addition, according to another aspect of the invention, there is provided a method of manufacturing a fuel cell stack including a plurality of fuel cells in which a fuel electrode, a solid oxide electrolyte, and an air electrode are sequentially laminated, and an interconnector that electrically connects the fuel cells which are adjacent to each other. The method includes depositing a material, which is expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 10 to 300, D: 10 to 400), on the interconnector that is fired so as to form a pre-interconnector connecting layer, depositing a material of the air electrode on the pre-interconnector connecting layer to form a pre-air electrode, and firing the pre-interconnector connecting layer and the pre-air electrode in combination with each other to form an interconnector connecting layer and the air electrode.

In the invention, the interconnector and the air electrode are joined to each other with the interconnector connecting layer interposed therebetween. The interconnector connecting layer is formed from a material that is expressed by the composition formula through firing, and thus the fuel cell stack has satisfactory power generation performance, durability, and thermal cycle resistance.

In $(La_{1-x-y}Sr_xCa_y)_zMnO_3$, Z is equal to or greater than 0.95, and less than 1. $(La_{1-x-y}Sr_xCa_y)_zMnO_3$ has a perovskite structure ($ABO_3$), and Z represents a molar ratio (A/B ratio) between an A site and a B site. When the A/B ratio is less than 0.95, the power generation performance of the fuel cell stack decreases. When the A/B ratio is equal to or greater than 1, the power generation performance and the thermal cycle resistance of the fuel cell stack decrease.

At the A site $(La_{1-x-y}Sr_xCa_y)$ of the $(La_{1-x-y}Sr_xCa_y)_zMnO_3$, when La, Sr, and Ca are set to the above-described range, it is possible to make the power generation performance, the durability, and the thermal cycle resistance of the fuel cell stack satisfactory.

A material of the interconnector connecting layer contains $SiO_2$ in an amount of 10 ppm to 300 ppm. The amount of $SiO_2$ is preferably 100) ppm to 300 ppm. When containing $SiO_2$ in the above-described range, the fuel cell stack has high power generation performance and durability. When the amount of $SiO_2$ is less than 10 ppm, the power generation performance and the thermal cycle resistance decrease. When the amount of $SiO_2$ is greater than 300 ppm, the power generation performance of the fuel cell stack decreases.

A material of the interconnector connecting layer contains MgO in an amount of 10 ppm to 400 ppm. The amount of MgO is preferably 100 ppm to 400 ppm. When containing MgO in the above-described range, the fuel cell stack has high power generation performance and durability. When the amount of MgO is less than 10 ppm, the durability and the thermal cycle resistance weaken. When the amount of MgO is greater than 400 ppm, the power generation performance and the durability of the fuel cell stack decrease.

"Pre" represents a green body in a state in which a raw material is molded and is not fired.

According to the aspect, it is preferable that a shrinkage ratio when the interconnector connecting layer is fired at 1200° C. for 2 hours is 8% to 25%.

When the shrinkage ratio of the interconnector connecting layer before and after firing at 1200° C. for 2 hours is less than 8%, adhesiveness between the interconnector and the air electrode deteriorates, and thus the power generation performance, the durability, and the thermal cycle resistance of the fuel cell stack do not satisfy specifications. On the other hand, when the shrinkage ratio of the interconnector connecting layer before and after sintering at 1200° C. is greater than 25%, the interconnector connecting layer is excessively shrunk, and cracking and peeling-off occur. As a result, the power generation performance, the durability, and the thermal cycle resistance do not satisfy the specifications.

According to the aspect, it is preferable that a film thickness of the interconnector connecting layer is set to 3 μm to 20 μm.

When the film thickness of the interconnector connecting layer is less than 3 μm, the thermal cycle resistance of the fuel cell stack weakens. On the other hand, when the film thickness of the interconnector connecting layer is greater than 20 μm, the power generation performance and the thermal cycle resistance of the fuel cell stack weaken.

According to a further aspect of the invention, there is provided a high-temperature water vapor electrolysis cell stack including: a plurality of electrolysis cells in which a hydrogen electrode, a solid oxide electrolyte, and an oxygen electrode are sequentially laminated; an interconnector that electrically connects the electrolysis cells which are adjacent to each other; and an interconnector connecting layer that is interposed directly between the oxygen electrode and the interconnector. The interconnector connecting layer is formed from a material, which is expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 10 to 300, D: 10 to 400), through firing.

According to a still further aspect of the invention, there is provided a method of manufacturing a high-temperature water vapor electrolysis cell stack including a plurality of electrolysis cells in which a hydrogen electrode, a solid oxide electrolyte, and an oxygen electrode are sequentially laminated, and an interconnector that electrically connects the electrolysis cells which are adjacent to each other, the method including: depositing a material, which is expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 10 to 300, D: 10 to 400), on the interconnector that is fired so as to form a pre-interconnector connecting layer; depositing a material of the oxygen electrode on the pre-interconnector connecting layer to form a pre-oxygen electrode; and firing the pre-interconnector connecting layer and the pre-oxygen electrode in combination with each other to form an interconnector connecting layer and the oxygen electrode.

Advantage of the Invention

According to the invention, the interconnector connecting layer, which is formed from a material expressed by a composition formula of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 10 to 300, D: 10 to 400), is provided between the interconnector and the air electrode, and thus it is possible to realize satisfactory power generation performance, durability, and thermal cycle resistance in the fuel cell stack, and the fuel battery module.

BEST MODE FOR CARRYING OUT THE INVENTION

Hereinafter, an embodiment of a fuel cell stack and a method of manufacturing the same, and a fuel cell module according to the invention will be described with reference to the accompanying drawings.

In the following description, for ease of explanation, a positional relationship of respective components is specified by using expressions of "upper" and "lower" on the basis of a paper plane, but it is not necessary for the limitation to be applied to a vertical direction. For example, an upper direction on the paper plane may correspond to a lower direction in a vertical direction. In addition, an upper and lower direction on the paper plane may correspond to a horizontal direction that extends in a vertical direction.

Figure 1:
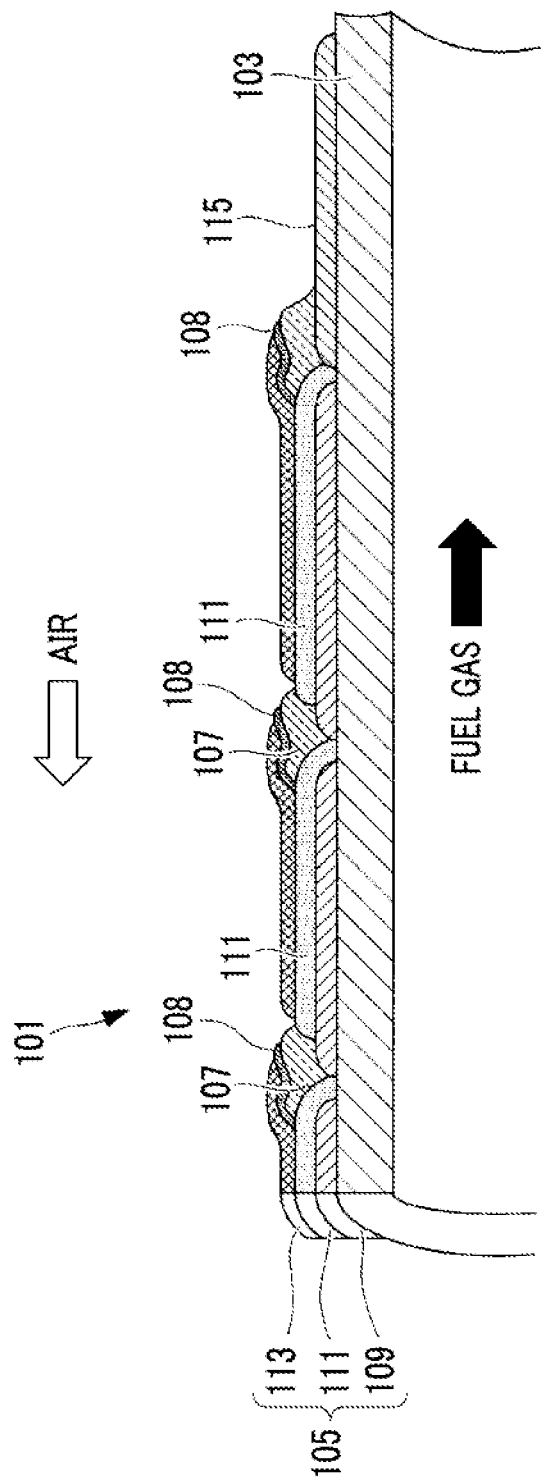
FIG. 1 is a view illustrating an aspect of a fuel cell stack according to the invention.

First, a fuel cell stack (hereinafter, referred to as a cell stack) according to this embodiment will be described with reference to FIG. 1. A cell stack 101 includes a tubular substrate 103, a plurality of fuel cells 105 which are formed on an outer surface of substrate 103, and an interconnector 107 that is formed between the fuel cells 105 which are adjacent to each other. Each of the fuel cells 105 has a configuration in which a fuel electrode 109, a solid oxide electrolyte 111, and an air electrode 113 are laminated. In addition, the cell stack 101 includes a lead film 115 that is electrically connected to the air electrode 113 of the fuel cell 105, which is formed at the outermost end in an axial direction of substrate 103 among the plurality of fuel cells 105 which are formed on the outer surface of substrate 103, through the interconnector 107.

In addition, the cell stack 101 includes an interconnector connecting layer 108 that is interposed directly between the interconnector and the air electrode.

Substrate 103 is formed from a porous material, and examples of the porous material include CaO-stabilized $ZrO_2$(CSZ), $Y_2O_3$-stabilized $ZrO_2$(YSZ), or $MgAl_2O_4$. Substrate 103 supports the fuel cells 105, the interconnector 107, and the lead film 115, and diffuses a fuel gas supplied to the inner surface of substrate 103 to the fuel electrode 109, which is formed on the outer surface of substrate 103, through pores in substrate 103.

The fuel electrode 109 is constituted by an oxide of a composite material of Ni and a Zirconia-based electrolyte material, and for example, Ni/YSZ is used. In this case, in the fuel electrode 109, Ni, which is a component of the fuel electrode 109, has a catalytic operation with respect to the fuel gas. The catalytic operation is an operation of allowing the fuel gas supplied through substrate 103 to react with, for example, a mixed gas of methane ($CH_4$) and water vapor for reforming into hydrogen ($H_2$) and carbon monoxide (CO). In addition, the fuel electrode 109 allows the hydrogen ($H_2$) and the carbon monoxide (CO) which can be obtained through the reforming to electrochemically react with an oxygen ion ($O^{2-}$) that is supplied through the solid oxide electrolyte 111 in the vicinity of an interface with the solid oxide electrolyte 111 so as to generate water ($H_2O$) and carbon dioxide ($CO_2$). In addition, the fuel cells 105 generate electricity by using electrons which are emitted from the oxygen ion at this time.

As the solid oxide electrolyte 111, YSZ, which has air-tightness at which a gas is difficult to be penetrated therethrough, and high oxygen ion conductivity at a high temperature, is mainly used. The solid oxide electrolyte 111 moves the oxygen ion ($O^{2-}$) that is generated in the air electrode to the fuel electrode.

For example, the air electrode 113 is constituted by an $LaMnO_3$-based oxide or an $LaCo_3$-based oxide. The $LaMnO_3$-based oxide includes $LaSrMnO_3$ and $LaSrCaMnO_3$. The air electrode 113 dissociates oxygen contained in an oxidizing gas such as air, which is supplied, in the vicinity of an interface with the solid oxide electrolyte 111, thereby generating an oxygen ion ($O^{2-}$).

The interconnector 107 is constituted by a conductive perovskite-type oxide such as a $SrTiO_3$ system that is expressed by $M_{1-x}L_xTiO_3$ (M represents an alkali-earth metal element, and L represents a lanthanoid element), and is formed in a dense layer in order for a fuel gas and the oxidizing gas not to be mixed with each other. In addition, the interconnector 107 has stable electrical conductivity under both an oxidizing atmosphere and a reducing atmosphere. With respect to the fuel cells 105 which are adjacent to each other, the interconnector 107 electrically connects an air electrode 113 of one fuel cell 105 and a fuel electrode 109 of the other fuel cell 105, thereby connecting the fuel cells 105 which are adjacent to each other in series. It is necessary for the lead film 115 to have electrical conductivity, and a thermal expansion coefficient that is close to that of other materials which constitute the cell stack 101, and thus the lead film 115 is constituted by a composite material of Ni and a zirconia-based electrolyte material such as Ni/YSZ. The lead film 15 leads out DC power, which is generated in the plurality of fuel cells 105 which are connected in series by the interconnector, to the vicinity of an end of the cell stack 101.

The interconnector connecting layer 108 is formed from a material expressed by a composition formula $(La_{1-x-y}Sr_zCa_y)_zMnO_3$-AppmSiO$_2$-DppmMgO through firing. Provided that, relationships of $0<x\leq0.4$, $0<y\leq0.4$, $0.1\leq x+y\leq0.5$, and $0.95\leq z<1$ are satisfied, A is 10 to 300, and D is 10 to 400. A is preferably 100 to 300, and D is preferably 100 to 400. $(La_{1-x-y}Sr_xCa_y)_zMnO_3$ has a perovskite structure. $SiO_2$ and MgO are extremely small amount components. A shrinkage ratio of the interconnector connecting layer 108 before and after sintering at 1200° C. may be 8% to 25%. The film thickness of the interconnector connecting layer 108 may be 3 µm to 20 µm. The interconnector connecting layer 108 joins the interconnector 107 and the air electrode 113 to each other.

Figure 2:
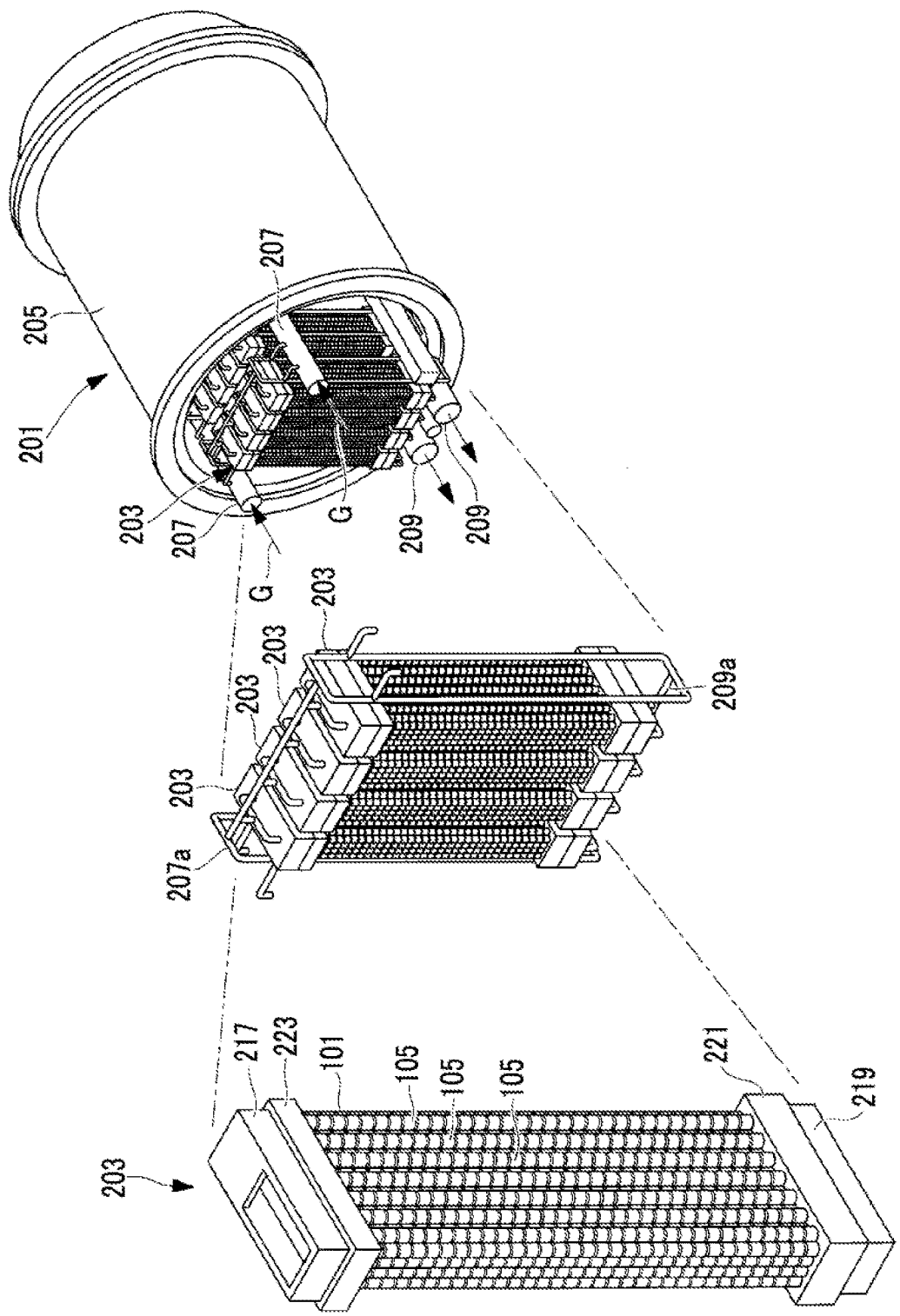
FIG. 2 is a view illustrating an aspect of an SOFC module according to the invention.
Figure 3:
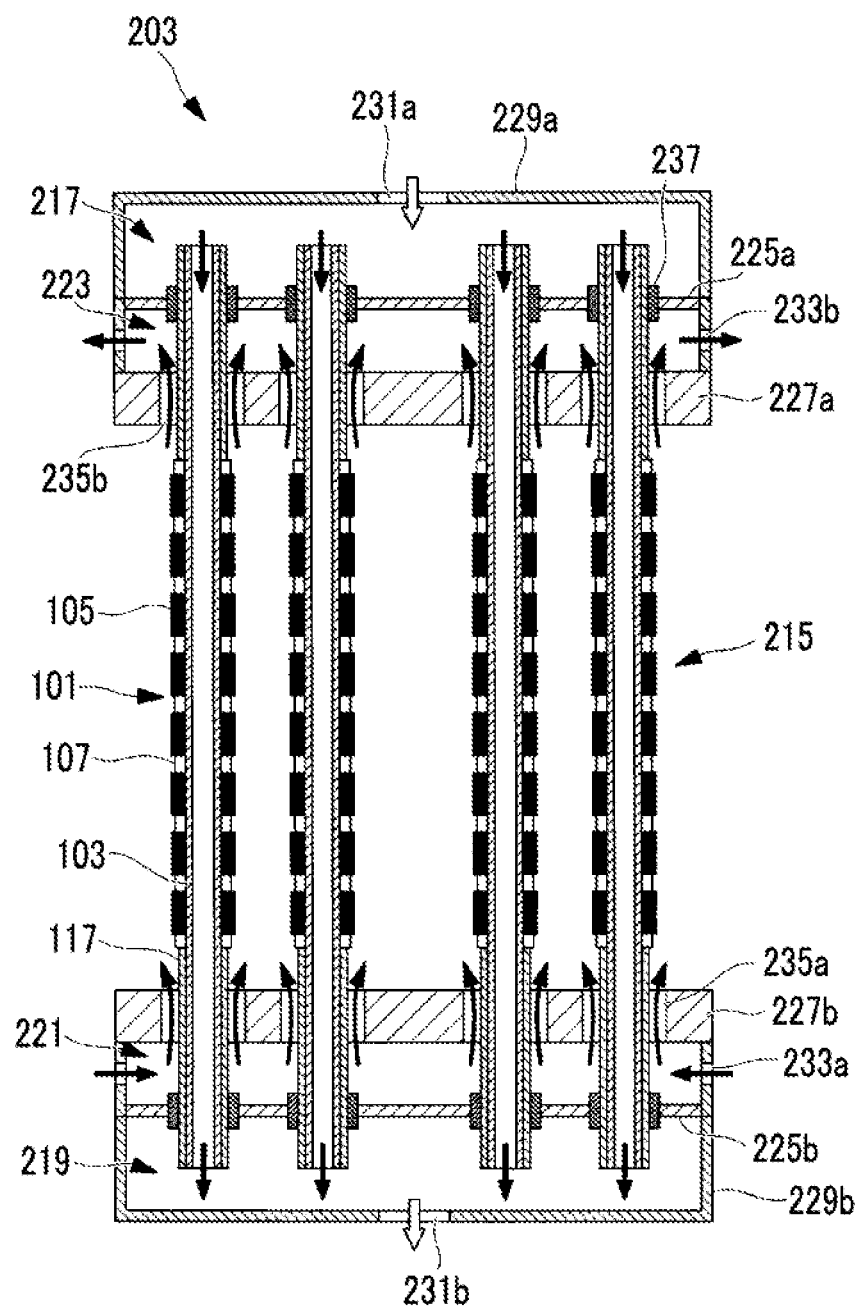
FIG. 3 is a view illustrating an aspect of a cross-section of an SOFC cartridge according to the invention.

Next, an SOFC module and an SOFC cartridge according to this embodiment will be described with reference to FIG. 2 and FIG. 3. Here, FIG. 2 illustrates an aspect of the SOFC module according to this embodiment. FIG. 3 is a cross-sectional view of an aspect of the SOFC cartridge according to this embodiment.

As illustrated in FIG. 2, for example, an SOFC module 201 includes a plurality of SOFC cartridges 203, and a pressure container 205 that accommodates the plurality of SOFC cartridges 203. In addition, the SOFC module 201 includes a fuel gas supply tube 207 and a plurality of fuel gas supply branch tubes 207a. In addition, the SOFC module 201 includes a fuel gas discharge tube 209, and a plurality of fuel gas discharge branch tubes 209a. In addition, the SOFC module 201 includes an oxidizing gas supply tube (not illustrated) and oxidizing gas supply branch tubes (not illustrated). In addition, the SOFC module 201 includes an oxidizing gas discharge tube (not illustrated) and a plurality of oxidizing gas discharge branch tubes (not illustrated).

The fuel gas supply tube 207 is provided on an outer side (not illustrated) of the pressure container 205, and is connected to a fuel gas supply portion that supplies a fuel gas having a predetermined gas composition at a predetermined flow rate in correspondence with an amount of power generation of the SOFC module 201, and is connected to the plurality of fuel gas supply branch tubes 207a. The fuel gas supply tube 207 guides the fuel gas, which is supplied from the above-described fuel gas supply portion at a predetermined flow rate, to the plurality of fuel gas supply branch tubes 207a in a diverged manner. In addition, the fuel gas supply branch tubes 207a are connected to the fuel gas supply tube 207, and are connected to the plurality of SOFC cartridges 203. The fuel gas supply branch tubes 207a guide the fuel gas, which is supplied from the fuel gas supply tube 207, to the plurality of SOFC cartridges 203 at an approximately uniform flow rate, thereby making power generation performance of the plurality of SOFC cartridges 203 approximately uniform.

The fuel gas discharge branch tubes 209a are connected to the plurality of SOFC cartridges 203, and are connected to the fuel gas discharge tube 209. The fuel gas supply branch tubes 209a guides a flue fuel gas, which is discharged from the SOFC cartridges 203, to the fuel gas discharge tube 209. In addition, the fuel gas discharge tube 209 is connected to the plurality of fuel gas supply branch tubes 209a, and a part thereof is disposed on an outer side of the pressure container 205. The fuel gas discharge tube 209 guides the flue fuel gas, which is led out from the fuel gas discharge branch tubes 209a at an approximately uniform flow rate, to an outer side of the pressure container 205.

The pressure container 205 operates under conditions in which an inner pressure is set to 0.1 MPa to approximately 1 MPa, and an inner temperature is set to an atmospheric temperature of approximately 550° C., and thus a material, which has proof stress properties and corrosion resistance against an oxidizing agent such as oxygen contained in the oxidizing gas, is used in the pressure container 205. For example, a stainless steel-based material such as SUS304 is suitable.

Her, in this embodiment, description has been given of an aspect in which the plurality of SOFC cartridges 203 are gathered and are accommodated in the pressure container 205, but there is no limitation thereto. For example, it is also possible to employ an aspect in which the SOFC cartridges 203 are accommodated in the pressure container 205 without being gathered.

As illustrated in FIG. 3, each of the SOFC cartridges 203 includes a plurality of cell stacks 101, a generating chamber 215, a fuel gas supply chamber 217, a fuel gas discharge chamber 219, an oxidizing gas supply chamber 221, and an oxidizing gas discharge chamber 223. In addition, the SOFC cartridge 203 includes an upper tube plate 225a, a lower tube plate 225b, an upper heat insulating body 227a, and a lower heat insulating body 227b. However, in this embodiment, the SOFC cartridge 203 has a configuration in which the fuel gas supply chamber 217, the fuel gas discharge chamber 219, the oxidizing gas supply chamber 221, and the oxidizing gas discharge chamber 223 are disposed as illustrated in FIG. 3, and thus the fuel gas and the oxidizing gas flow on an inner side and an outer side of each of the cell stacks 101 in directions opposite to each other. However, it is not necessary to have this configuration. The fuel gas and the oxidizing gas may be allowed to flow in parallel with each other on an inner side and on an outer side of the cell stack, or the oxidizing gas may be allowed to flow in a direction perpendicular to the longitudinal direction of the cell stack.

The generating chamber 215 is a region that is formed between the upper heat insulating body 227a and the lower heat insulating body 227b. The generating chamber 215 is a region in which fuel cells 105 of the cell stacks 101 are disposed, and thus power generation is performed by allowing the fuel gas and the oxidizing gas to electrochemically react with each other. In addition, the temperature in the vicinity of the central portion of the cell stacks of the generating chamber 215 in a longitudinal direction become s an atmosphere as high as approximately 700° C. to 1000° C. during normal operation of the fuel cell module 201.

The fuel gas supply chamber 217 is a region that is surrounded by an upper casing 229a and the upper tube plate 225a of the SOFC cartridge 203. In addition, the fuel gas supply chamber 217 communicates with the fuel gas supply branch tubes 207a (not illustrated) through a fuel gas supply hole 231a formed in the upper casing 229a. In addition, in the fuel gas supply chamber 217, ends on one side of the cell stacks 101 are disposed in such a manner that the inside of substrate 103 of the cell stacks 101 is opened to the fuel gas discharge chamber 219. The fuel gas supply chamber 217 guides the fuel gas, which is supplied from the fuel gas supply branch tubes 207a (not illustrated) through the fuel gas supply hole 231a, to the inside of substrate 105(103?) of the plurality of cell stacks 101 at an approximately uniform flow rate, thereby making the power generation performance of the plurality of cell stacks 101 approximately uniform.

The fuel gas discharge chamber 219 is a region that is surrounded by a lower casing 229b and the lower tube plate 225b of the SOFC cartridge 203. In addition, the fuel gas discharge chamber 219 communicates with the fuel gas discharge branch tubes 209a (not illustrated) through a fuel gas discharge hole 231b formed in the lower casing 229b. In addition, in the fuel gas discharge chamber 219, ends on the other side of the cell stacks 101 are disposed in such a manner that the inside of substrate 105 of the cell stacks 101 is opened to the fuel gas discharge chamber 219. The fuel gas discharge chamber 219 collects an flue fuel gas to be supplied to the fuel gas discharge chamber 219 through the inside of substrate 105(103?) of the plurality of cell stacks 101, and guides the flue fuel gas to the fuel gas discharge branch tubes 209a (not illustrated) through the fuel gas discharge hole 231b.

The oxidizing gas, which is set to a predetermined gas composition and a predetermined flow rate in correspondence with an amount of power generation in the SOFC module 201, is diverged to the oxidizing gas supply branch tubes, and is supplied to the plurality of SOFC cartridges 203. The oxidizing gas supply chamber 221 is a region that is surrounded by the lower casing 229b, the lower tube plate 225b, and the lower heat insulating body 227b of the SOFC cartridge 203. In addition, the oxidizing gas supply chamber 221 communicates with the oxidizing gas supply branch tube s (not illustrated) through an oxidizing gas supply hole 233a formed in the lower casing 229b. The oxidizing gas supply chamber 221 guides the oxidizing gas, which is supplied from the oxidizing gas supply branch tubes (not illustrated) at a predetermined flow rate through the oxidizing gas supply hole 233a, to the generating chamber 215 through an oxidizing gas supply gap 235a to be described later.

The oxidizing gas discharge chamber 223 is a region that is surrounded by the upper casing 229a, the upper tube plate 225a, and the upper heat insulating body 227a of the SOFC cartridge 203. In addition, the oxidizing gas discharge chamber 223 communicates with the oxidizing gas discharge branch tubes (not illustrated) through an oxidizing gas discharge hole 233b that is formed in the upper casing 229a. The oxidizing gas discharge chamber 223 guides the flue oxidizing gas, which is supplied to the fuel gas discharge chamber 223 from the generating chamber 215 through an oxidizing gas discharge gap 235b to be described later, to third oxidizing gas discharge branch tubes 209b (not illustrated) through the oxidizing gas discharge hole 233b.

The upper tube plate 225a is fixed to a side plate of the upper casing 229a between a ceiling plate of the upper casing 229a and the upper heat insulating body 227a in such a manner that the upper tube plate 225a, the ceiling plate of the upper casing 229a, and the upper heat insulating body 227a become approximately parallel with each other. In addition, the upper tube plate 225a has a plurality of holes corresponding to the number of the cell stacks 101 provided to the SOFC cartridge 203, and the cell stacks 101 are inserted into the holes, respectively. The upper tube plate 225a air-tightly supports ends on one side of the plurality of cell stacks 101 through one or both of a sealing member and a bonding member, and isolates the fuel gas supply chamber 217 and the oxidizing gas discharge chamber 223 from each other.

The lower tube plate 225b is fixed to a side plate of the lower casing 229b between a bottom plate of the lower casing 229b and the lower heat insulating body 227b in such a manner that the lower tube plate 225b, the bottom plate of the lower casing 229b, and the lower heat insulating body 227b become approximately parallel with other. In addition, the lower tube plate 225b has a plurality of holes corresponding to the number of the cell stacks 101 provided in the SOFC, cartridge 203, and the cell stacks 101 are inserted into the holes, respectively. The lower tube plate 225b air-tightly supports ends on the other side of the plurality cell stacks 101 through one or both of a sealing member and a bonding member, and isolates the fuel gas discharge chamber 219 and the oxidizing gas supply chamber 221 from each other.

The upper heat insulating body 227a is disposed at a lower end portion of the upper casing 229a in such a manner that the upper heat insulating body 227a, the ceiling plate of the upper casing 229a, and the upper tube plate 225a become approximately parallel with each other, and is fixed to the side plate of the upper casing 229a. In addition, the upper heat insulating body 227a has a plurality of holes in correspondence with the number of the cell stacks 101 provided in the SOFC cartridge 203. The diameter of the holes is set to be greater than the outer diameter of the cell stacks 101. The upper heat insulating body 227a has the oxidizing gas discharge gap 235b that is formed between an inner surface of each of the holes, and an outer surface of each of the cell stacks 101 which are inserted into the upper heat insulating body 227a.

The upper heat insulating body 227a partitions the generating chamber 215, and the oxidizing gas discharge chamber 223, and suppresses a decrease in strength due to an increase in a temperature in an ambient atmosphere of the upper tube plate 225a, or an increase in corrosion due to an oxidizing agent contained in the oxidizing gas. The upper tube plate 225a and the like are formed from a metal material such as Inconel having high-temperature durability, but the upper heat insulating body 227a prevents a situation in which the upper tube plate 225a and the like are exposed to a high temperature inside the generating chamber 215, and are thermally deformed due to an increase in a temperature difference inside the upper tube plate 225a and the like. In addition, the upper heat insulating body 227a allows the flue oxidizing gas, which passes through the generating chamber 215 and is exposed to a high temperature, to pass through the oxidizing gas discharge gap 235b to be guided to the oxidizing gas discharge chamber 223.

According to this embodiment, the fuel gas and the oxidizing gas are allowed to flow on an inner side and an outer side of each of the cell stacks 101 in directions opposite to each other due to the structure of the SOFC cartridge 203. According to this, the flue oxidizing gas is heat-exchanged which the fuel gas which passes through the inside of substrate 103 and is supplied to the generating chamber 215, and is cooled down to a temperature at which deformation such as buckling does not occur in the upper tube plate 225a and the like which are formed from a metal material, and is supplied to the oxidizing gas discharge chamber 223. In addition, a temperature of the fuel gas is raised due to heat exchange with the flue oxidizing gas that is discharged from the generating chamber 215, and then the flue oxidizing gas is supplied to the generating chamber 215. As a result, it is possible to supply the fuel gas, which is preheated and a temperature thereof is raised to a temperature appropriate for power generation without using a heater and the like, to the generating chamber 215.

The lower heat insulating body 227b is disposed at an upper end portion of the lower casing 229b in such a manner that the lower heat insulating body 227b, the bottom plate of the lower casing 229b, and the lower tube plate 225b become approximately parallel with each other, and is fixed to the side plate of the lower casing 229b. In addition, the lower heat insulating body 227b has a plurality of holes in correspondence with the number of the cell stacks 101 provided to the SOFC cartridge 203. The diameter of the hole is set to be greater than the outer diameter of the cell stacks 10. The lower heat insulating body 227b has the oxidizing gas supply gap 235a that is formed between an inner surface of each of the holes, and an outer surface of each of the cell stacks 101 which are inserted into the lower heat insulating body 227b.

The lower heat insulating body 227b partitions the generating chamber 215 and the oxidizing gas supply chamber 221, and suppresses a decrease in strength due to an increase in a temperature in an ambient atmosphere of the lower tube plate 225b, or an increase in corrosion due to the oxidizing agent contained in the oxidizing gas. The lower tube plate 225b and the like are formed from a metal material such as Inconel having high-temperature durability, but the lower heat insulating body 227b prevents a situation in which the lower tube late 225b and the like are exposed to a high temperature, and are thermally de formed due to an increase in a temperature difference inside the lower tube plate 225b and the like. In addition, the lower heat insulating body 227b allows the oxidizing gas, which is supplied to the oxidizing gas supply chamber 221, to pass through the oxidizing gas supply gap 235a to be guided to the generating chamber 215.

According to this embodiment, the fuel gas and the oxidizing gas are allowed to flow on an inner side and an outer side of each of the cell stacks 101 in directions opposite to each other due to the structure of the SOFC cartridge 203. According to this, the flue fuel gas, which passes through the inside of substrate 103 and passes through the generating chamber 215, is heat-exchanged with the oxidizing gas that is supplied to the generating chamber 215, and is cooled down to a temperature at which deformation such as buckling does not occur in the lower tube plate 225b and the like which are formed from a metal material, and is supplied to the fuel gas discharge chamber 219. In addition, a temperature of the oxidizing gas is raised due to heat exchange with the flue fuel gas, and is supplied to the generating chamber 215. As a result, it is possible to supply the oxidizing gas, of which a temperature is raised to a temperature necessary for power generation without using a heater and the like, to the generating chamber 215.

DC power that is generated in the generating chamber 215 is led out to the vicinity of the end of the cell stacks 101 through the lead film 115 which is provided to the plurality of fuel cells 105 and is formed from Ni/YSZ and the like, is collected to a current collecting rod of the SOFC cartridge 203 (not illustrated) through a current collecting plate (not illustrated), and is conducted to the outside of the respective SOFC cartridges 203. The generated power, which is led out to the outside of the SOFC cartridges 203 by the current collecting rod, is led out to the outside of the SOFC module 201 in which a predetermined number of the SOFC cartridges 203 are connected in parallel, and a predetermined number of the SOFC cartridges 203 are connected in series, and is converted into predetermined AC power by an inverter (not illustrated) and the like and is supplied as a power load.

Next, a method of manufacturing the fuel cell stack according to this embodiment will be described.

First, water is added to a material of substrate, and is the mixture is kneaded. The resultant kneaded mixture is molded into a tubular shape through extrusion molding and the like, and the resultant molded body is dried. The resultant dried molded body is set as a pre-substrate.

A binder liquid is added to a material of the fuel electrode to prepare slurry for a fuel electrode. The slurry for a fuel electrode is applied to a predetermined position on an outer surface of the pre-substrate by the screen printing method and the like to form the pre-fuel electrode as a layer. Application of the slurry for a fuel electrode may be repeatedly performed until the pre-fuel electrode has a predetermined thickness. At least on one end side of the pre-substrate, the slurry for a fuel electrode may be applied to a position that deviates from an end of the pre-substrate toward an inner side therof so that the end of the pre-substrate is exposed.

A binder liquid is added to a material of the solid oxide electrolyte to prepare slurry for a solid oxide electrolyte. The slurry for a solid oxide electrolyte is applied onto the pre-fuel electrode by a screen printing method and the like to form a pre-solid oxide electrolyte as a layer. Application of the slurry for a solid oxide electrolyte may be repeatedly performed until the pre-solid oxide electrolyte has a predetermined thickness. At least on one end side of the pre-substrate, the slurry for a solid oxide electrolyte may be printed to a position that deviates from an end of the pre-substrate toward an inner side thereof so that the slurry for a fuel electrode is exposed.

A binder liquid is added to a material of the interconnector to prepare slurry for an interconnector. The slurry for an interconnector is applied to a predetermined position so that power generating cells which are adjacent to each other are electrically connected in series, thereby forming a pre-interconnector as a layer. The slurry for an interconnector may be applied by the screen printing method and the like. The application of the slurry for an interconnector may be repeatedly performed until the pre-interconnector has a predetermined thickness.

The pre-substrate on which the pre-fuel electrode, the pre-solid oxide electrolyte, and the pre-interconnector are formed as a layer is fired in the air to obtain substrate including a co-sintered body of the fuel electrode, the solid oxide electrolyte, and the interconnector. For example, the firing is performed by using an electric furnace under conditions of 1400° C. and 5 hours. The interconnector that is a sintered body is thermally stable.

When collectively firing the pre-fuel electrode, the pre-solid oxide electrolyte, and the pre-interconnector, a pre-lead layer may be simultaneously fired. The pre-lead layer is formed by preparing slurry for a lead layer in the same manner as the slurry for a fuel electrode, and by applying the slurry for a lead layer to a predetermined position of the pre-substrate.

In the interconnector connecting layer, a material, which is expressed by a composition of $(La_{1-x-y}Sr_xCa_y)_zMnO_3$-AppmSiO$_2$-DppmMgO (provided that, $0<x\leq0.4$, $0<y\leq0.4$, $0.1\leq x+y\leq0.5$, $0.95\leq z<1$, A: 10 to 300, D: 10 to 400), is used. For example, $(La_{1-x-y}Sr_xCa_y)_zMnO_3$ may be synthesized by mixing $La_2O_3$, $SrCO_3$, $CaCO_3$, and $MnO_2$, and by heating the resultant mixture to a predetermined temperature. For example, $(Si(OC_2H_5)_4$, tetraethoxysilane), $MgO(Mg(OH)_2$, magnesium hydroxide), and the like may be added to the mixture to adjust the concentration of $SiO_2$ and MgO to a predetermined concentration. After synthesis, the resultant synthesized material is pulverized by a pulverizer to obtain a material (powder) of the interconnector connecting layer. A pulverization time is set in such a manner that a shrinkage ratio of the interconnector connecting layer when being fired at 1200° C. be come s 8% to 25%. When the pulverization time is too long, the powder becomes fine particles and thus the shrinkage ratio increases. In contrast, when the pulverization time is too short, the powder does not become fine particles, and thus the shrinkage ratio decreases.

A binder liquid is added to the material of the interconnector connecting layer to prepare slurry for an interconnector connecting layer. The slurry for an interconnector connecting layer is applied onto the interconnector that is fired by the screen printing method and the like to form a pre-interconnector connecting layer. Application of the slurry for an interconnector connecting layer may be repeatedly per formed until the pre-interconnector connecting layer has a predetermined thickness. The pre-interconnector connecting layer may be applied to the entire region of the interconnector with which the air electrode is to overlap.

A binder liquid is added to a material of the air electrode to prepare slurry for an air electrode. The material of the air electrode may be constituted by coarse particles having a small shrinkage ratio and fine particles. The slurry for an air electrode is applied to a predetermined region on the co-sintered body that is fired and onto the re-interconnector connecting layer by the screen printing method and the like to form a pre-air electrode as a layer. Application of the slurry for an air electrode may be repeatedly performed until the pre-air electrode has a predetermined thickness.

Substrate in which the pre-interconnector connecting layer and the pre-air electrode are formed on the co-sintered body is fired at a predetermined temperature to form sintered bodies of the interconnector connecting layer and the air electrode. The firing temperature is set to 1150° C. to 1300° C., and the firing time is set to 2 hours to 5 hours.

Next, description will be given of a setting basis of a composition ratio of the material of the interconnector connecting layer.

Fuel cell stacks including various interconnector connecting layer, in which a material composition and the like are different in each case, were prepared in accordance with the embodiment, and the performance (power gene rat ion performance, durability, heat-resistant cycle heat cycle resistance characteristics) of the fuel cell stacks was evaluated.

(Preparation of Fuel Cell Stack)

First, methyl cellulose, polyethylene oxide, and glycerin were added to a raw material of substrate which includes calcia-stabilized zirconia (CSZ) as a main raw material, and the resultant mixture was kneaded in a paste shape by using pressurizing kneader while adding water to the mixture. The resultant kneaded mixture was molded in a tubular shape having a thickness of 3 mm by using an auger type extruder, and the resultant molded body was dried. The resultant dried molded body was set as the pre-substrate.

Next, a binder liquid was added to a material of the fuel electrode which includes NiO and YSZ as a main component, and a shearing force was applied to the resultant mixture with three rollers to prepare slurry for a fuel electrode. The slurry for a fuel electrode was applied to a predetermined position on the pre-substrate by using the screen printing method. Application of the slurry for a fuel electrode was repeated until the layer thickness of the pre-fuel electrode became 100 μm.

As a material of the solid oxide electrolyte, YSZ was used. A binder liquid was added to YSZ, and slurry for a solid oxide electrolyte was prepared by using three rollers. The slurry for a solid oxide electrolyte was applied onto the pre-fuel electrode by using the screen printing method. Application of the slurry for a solid oxide electrolyte was repeated until the layer thickness of the pre-solid oxide electrolyte became 80 μm.

As a material of the interconnector, $Sr_{0.9}La_{0.1}TiO_3$ (powder) was used. A binder liquid was added to YSZ, and slurry for an interconnector was prepared by using three rollers. The slurry for an interconnector was applied to a predetermined position on the pre-substrate by using the screen printing method. Application of the slurry for an interconnector was repeated until the layer thickness of the pr-interconnector became 30 μm.

The pre-substrate on which pre-fuel electrode, the pre-solid oxide electrolyte, and the pre-interconnector were formed as a layer was dried, and was held at 1400° C. for 3 hours for co-sintering.

A synthesized powder, which is expressed by a composition formula of $(La_{1-x-y}Sr_xCa_y)_zMnO_3$-AppmSiO$_2$-DppmMgO, and is a material of the interconnector connecting layer, was prepared as follows. La$_2$O$_3$, SrCO$_3$, CaCO$_3$, and MnO$_2$ were mixed in an arbitrary ratio. Si(OC$_2$H$_5$) and Mg(OH)$_2$ were added to the resultant mixture in a specified amount, thereby adjusting an amount of a extremely small amount element (SiO$_2$, MgO) therein. The resultant mixture was heated at 1150° C. to synthesize a perovskite phase. The synthesized material was subjected to ball-mill wet-pulverization, in which ethanol was used as a solvent, for 24 hours, thereby obtaining a synthesized powder having a particle size of 0.8 μm.

A binder liquid was added to the material (synthesized powder) of the interconnector connecting layer to prepare slurry for an interconnector connecting layer. The slurry for an interconnector connecting layer was applied onto the interconnector that was fired by the screen printing method. Application of the slurry for an interconnector connecting layer was repeated until the pre-interconnector connecting layer had an arbitrary thickness.

A basic composition of a material of the air electrode was set to $(La_{0.5}Sr_{0.25}Ca_{0.25})_{0.95}MnO_3$. A binder liquid was added to the material of the air electrode, and the resultant mixture was kneaded by using three rollers, thereby preparing slurry for an air electrode. The slurry for an air electrode was applied to a predetermined region on the co-sintered body that was fired and onto the pre-interconnector connecting layer by the screen printing method. Application of the slurry for an air electrode was repeated until the film thickness of the pre-air electrode reached a predetermined thickness.

Substrate in which the pre-interconnector connecting layer and the pre-air electrode were formed on the co-sintered body was held at 1200° C. for 2 hours for firing, and the resultant stacked body was set as a fuel cell stack.

The amount of La, Sr, Ca, SiO$_2$, and MgO in the synthesized powder, the film thickness of the interconnector connecting layer, and the shrinkage ratio were changed in an arbitrary manner. Detailed compositions are illustrated in Table 1 to Table 6. An A/B ratio in Tables represents a ratio (z) between an A site and a B site of $(La_{1-x-y}Sr_xCa_y)_zMnO_3$ having a perovskite structure (ABO$_3$). An amount of a extremely small amount component (SiO$_2$, MgO) of the interconnector connecting layer in Tables is a value that is obtained by analyzing the synthesized powder, which was synthesized as described above, with high-frequency inductively coupled plasma (ICP). A thickness in Tables represents a value that is obtained by measuring the film thickness of the interconnector connecting layer after being fired. A shrinkage ratio in Tables is a value that is calculated from a length before firing and a length after firing in a case where the pre-interconnector connecting layer is monoaxially molded by using the synthesized powder and the resultant molded body is fired under conditions of 1200° C.×2 hours. In Sample Nos. 2 to 23 in Table 1 to Table 5, the A site is occupied by $(La_{0.5}Sr_{0.25}Ca_{0.25})$. In Sample Nos. 24 to 36 in Table 6, SiO$_2$ is set to 215 ppm, the amount of MgO is set to 252 ppm, the thickness is set to 12 μm, and the shrinkage ratio is set to 15%.

(Method of Evaluating Performance)

A sealing component was attached to the fuel cell stack, and a fuel (60% H$_2$-40% N$_2$) was allowed to flow to an inner side of the fuel cell stack, and the fuel cell stack was held at 900° C. Then, the performance (power generation performance, durability, and thermal cycle resistance characteristics) of the fuel cell stack was evaluated.

The power generation performance was evaluated with an operation potential at the time of 300 mA/cm$^2$. A fuel utilization rate during evaluation was 60%, and an air utilization rate during evaluation was 20%. When the operation potential was 0.75 V or greater, the power generation performance was determined as acceptable.

The durability was evaluated as a deterioration rate per 1000) hours. The deterioration rate per 1000 hours was assumed by multiplying a variation (variation from an initial value) in a current value at the time of 250-hour evaluation by four. When the deterioration rate is equal to or less than 0.25%/1000 hour, it is considered that durability is appropriate for practical use.

The thermal cycle resistance (H/C) characteristics were evaluated by applying heat cycles (room temperature (RT) ⇔ 900° C.) to the fuel cell stack, and by counting the number of heat cycles when the operation potential acquired during the power generation performance evaluation deteriorated by 5% or larger. During the evaluation, it was assumed that a periodic inspection is performed one time per a year and emergency stoppage is performed one time per a year, and thus heat cycles of 20 times are applied for 10 years. In a case where 20 times of heat cycles were applied, if the deterioration rate was 5% or less (that is, H/C exceeded 20 times), the thermal cycle resistance was determined as acceptable.

(Evaluation Results)

Results obtained by evaluating the performance are illustrated in Table 1 to Table 6.

TABLE 1

| Sample No. | A/B ratio | SiO$_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 1 | 1.00 | — | — | 25 | — | 0.78 | 0.15 | 12 |
| 2 | 0.93 | 212 | 258 | 15 | 19 | 0.73 | 0.025 | >20 |
| 3 | 0.95 | 223 | 264 | 13 | 21 | 0.78 | 0.03 | >20 |
| 4 | 0.99 | 217 | 247 | 16 | 15 | 0.77 | 0.04 | >20 |
| 5 | 1.01 | 226 | 253 | 15 | 17 | 0.73 | 0.06 | 10 |

Sample No. 1 is a fuel cell stack (example of related art) in which $La_{0.5}Sr_{0.25}Ca_{0.25}MnO_3$-40 wt % $Sm_{0.2}Ce_{0.8}O_2$ was used as the material of the interconnector connecting layer. Sample No. 1 satisfied the specifications of the power generation performance. However, a deterioration rate in the durability was large, and the thermal cycle resistance was poor, and thus Sample No. 1 did not satisfy acceptance criteria.

Sample Nos. 2 to 5 are samples in which the A/B ratio in the interconnector connecting layer was changed in a range of 0.93 to 1.01. In a case where the A/B ratio was too low (No. 2), the power generation performance did not satisfy the acceptance criteria. In a case where the A/B ratio was greater than 1 (No. 5), the power generation performance decreased, and the thermal cycle resistance characteristics weakened, and thus the acceptance criteria we re not satisfied. On the other hand, Nos. 3 and 4 satisfied the acceptance criteria of the power generation performance, the durability, and the thermal cycle resistance characteristics.

In a case where the A/B ratio is less than 0.95%, it can be considered that the power generation performance decreased due to an effect of Mn diffusion. In addition, in a case where the A/B ratio was less than 0.95%, it can also be considered that sinterability of the interconnector connecting layer was excessive, and thus cracking occurred between the interconnector and the air elect rode, and as a result, the power generation performance decreased. In a case where the A/B ratio was 1% or larger, it can be considered that the sinterability of the interconnector connecting layer decreased, and thus peeling-off occurred between the interconnector and the air electrode (adhesiveness decreased), and as a result, the power generation performance decreased, and the thermal cycle resistance characteristics weakened.

From the above-described results, the A/B ratio is defined to be equal to or greater than 0.95 and less than 1.

TABLE 2

| Sample No. | A/B ratio | $SiO_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 6 | 0.97 | 7 | 256 | 16 | 15 | 0.74 | 0.035 | 15 |
| 7 | 0.97 | 9 | 249 | 12 | 18 | 0.75 | 0.04 | >20 |
| 8 | 0.97 | 98 | 254 | 15 | 20 | 0.8 | 0.045 | >20 |
| 9 | 0.97 | 302 | 253 | 14 | 16 | 0.77 | 0.06 | >20 |
| 10 | 0.97 | 331 | 246 | 14 | 19 | 0.73 | 0.08 | >20 |

Sample Nos. 6 to 10 are samples in which an amount of $SiO_2$ contained in the material of the interconnector connecting layer was changed in a range of 7 ppm to 331 ppm. In No. 6 ($SiO_2$: 7 ppm), the power generation performance was low, and the thermal cycle resistance characteristics weakened, and thus the acceptance criteria were not satisfied. In No. 10 ($SiO_2$: 331 ppm) in which the amount of $SiO_2$ contained was high, the power generation performance was low, and thus the acceptance criteria were not satisfied. On the other hand, Nos. 7 to 9, the power generation performance, the durability, and the thermal cycle resistance characteristics satisfied the acceptance criteria.

In a case where the amount of $SiO_2$ contained is less than 10 ppm, it can be considered that a grain boundary phase of the interconnector connecting layer decreased, and thus sintering between grain boundaries was not sufficient (adhesiveness between the air electrode and the interconnector decreased) and electrical conductivity decreased, and as a result, the power generation performance was low, and the thermal cycle resistance characteristics weakened. In a case where the amount of $SiO_2$ contained is greater than 300 ppm, the grain boundary phase of the interconnector connecting layer increases, and thus insulating properties at a grain boundary portion strengthen and conductivity decreases, and as a result, the power generation performance decreases.

From the above-described results, the amount of $SiO_2$ contained is defined to 10 ppm to 300 ppm, and preferably 100 ppm to 300 ppm.

TABLE 3

| Sample No. | A/B ratio | $SiO_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 11 | 0.98 | 205 | 8 | 16 | 20 | 0.76 | 0.135 | 15 |
| 12 | 0.98 | 198 | 10 | 12 | 22 | 0.77 | 0.11 | >20 |

TABLE 3-continued

| Sample No. | A/B ratio | SiO$_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 13 | 0.98 | 208 | 97 | 16 | 19 | 0.81 | 0.08 | >20 |
| 14 | 0.98 | 212 | 404 | 13 | 17 | 0.75 | 0.11 | >20 |
| 15 | 0.98 | 207 | 423 | 16 | 16 | 0.74 | 0.13 | >20 |

Sample Nos. 11 to 15 are samples in which an amount of MgO in the material of the interconnector connecting layer was changed in a range of 8 ppm to 423 ppm. In No. 11 (MgO: 8 ppm) in which the amount of MgO contained was small, the durability and the thermal cycle resistance characteristics were low, and thus the acceptance criteria were not satisfied. In No. 15 in which the amount of MgO contained was the greatest (MgO: 423 ppm), the power generation performance was low, and the durability was low, and thus the acceptance criteria were not satisfied. On the other hand, in Nos. 12 to 14, the power generation performance, the durability, and the thermal cycle resistance satisfied the acceptance criteria.

In a case where the amount of MgO contained is less than 10 ppm, it can be considered that the amount of MgO in a grain boundary portion of the interconnector connecting layer is small, and thus the grain boundary strength was weak and electrical connection was likely to deteriorate, and as a result, the durability was poor, and the thermal cycle resistance was also likely to deteriorate. In a case where the amount of MgO contained is larger than 400 ppm, evaluation can be considered as follows. The grain boundary phase of the interconnector connecting layer increases, and thus conductivity decreases. As a result, the power generation performance decreases. In addition to this, the amount of MgO is high, and thus Mg$^{2+}$ moves during operation and forms a second phase at a three-phase boundary. As a result, the resistance of the grain boundary phase is likely to increase, and thus the durability decreases.

From the above-described results, the amount of MgO contained is defined to 10 ppm to 400 ppm, and preferably 100 ppm to 400 ppm.

Sample Nos. 16 to 19 are samples in which the film thickness of the interconnector connecting layer was changed in a range of 1 μm to 24 μm. In No. 16 in which the interconnector connecting layer was the thinnest (film thickness: 1 μm), the thermal cycle resistance characteristics were weak, and thus the acceptance criteria were not satisfied. In No. 19 in which the interconnector connecting layer was the thickest (film thickness: 24 μm), the power generation performance and the thermal cycle resistance characteristics were weak, and thus the acceptance criteria were not satisfied. On the other hand, in Nos. 17 and 18, the acceptance criteria of the power generation performance, the durability, and the thermal cycle resistance characteristics were satisfied.

When the thickness of the interconnector connecting layer is less than 3 μm, the thermal cycle resistance characteristics weaken. However, the reason for this is considered to be because when a film of enhancing adhesiveness becomes thin, the layer cannot endure thermal stress during the heat cycles, and thus slight peeling-off occurs. In a case where the thickness of the interconnector connecting layer is greater than 20 μm, the power generation performance and the thermal cycle resistance characteristics weaken. The reason for this decrease can be considered as follows. The interconnector connecting layer has satisfactory sinterability in comparison to the air electrode, and thus when the thickness is too large, the amount of shrinkage increases, and cracking or peeling-off occurs. As a result, the power generation performance decreases, and the thermal cycle resistance characteristics also weaken.

From the above-described results, the thickness of the interconnector connecting layer is defined to be 3 μm to 20 μm.

TABLE 4

| Sample No. | A/B ratio | SiO$_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 16 | 0.97 | 208 | 255 | 1 | 19 | 0.75 | 0.05 | 8 |
| 17 | 0.97 | 208 | 255 | 3 | 18 | 0.76 | 0.045 | >20 |
| 18 | 0.97 | 208 | 255 | 20 | 19 | 0.75 | 0.025 | >20 |
| 19 | 0.97 | 208 | 255 | 24 | 17 | 0.74 | 0.02 | 15 |

TABLE 5

| Sample No. | A/B ratio | SiO$_2$ (ppm) | MgO (ppm) | Thickness (μm) | Shrinkage ratio (%) | Power generation performance Operation potential (V) | Durability (%/1000 hours) | H/C characteristics (times) |
|---|---|---|---|---|---|---|---|---|
| 20 | 0.99 | 197 | 252 | 14 | 6 | 0.74 | 0.14 | 10 |
| 21 | 0.97 | 202 | 223 | 16 | 8 | 0.75 | 0.12 | >20 |
| 22 | 0.96 | 208 | 235 | 13 | 25 | 0.755 | 0.11 | >20 |
| 23 | 0.95 | 206 | 227 | 17 | 27 | 0.74 | 0.13 | 8 |

Sample Nos. 20 to 23 are samples in which the shrinkage ratio of the interconnector connecting layer was changed in a range of 6% to 27%. In No. 20 in which the shrinkage ratio is the smallest (shrinkage ratio: 6%) and No. 23 in which the shrinkage ratio is the greatest (shrinkage ratio: 27%), the power generation performance, the durability, and the thermal cycle resistance characteristics did not satisfy the acceptance criteria. On the other hand, Nos. 21 and 22 satisfied the acceptance criteria of the power generation performance, the durability, and the thermal cycle resistance characteristics.

In a case where the shrinkage ratio of the interconnector connecting layer is less than 8%, it can be considered that adhesiveness between the interconnector and the air electrode deteriorated, and thus the power generation performance, the durability, and the thermal cycle resistance characteristics weakened. In a case where the shrinkage ratio of the interconnector connecting layer is larger than 25%, it can be considered that the interconnector connecting layer was shrunk excessively, and thus cracking or peeling-off occurred, and as a result, the power generation performance, the durability, and the thermal cycle resistance characteristics weakened.

From the above-described results, the shrinkage ratio of the interconnector connecting layer is defined as 8% to 25%.

respectively), the acceptance criteria of the power generation performance were not satisfied. No. 28 did not satisfy the acceptance criteria in the thermal cycle resistance characteristics. On the other hand, in Nos. 25 to 27, 31, and 32, the acceptance criteria of the power generation performance, the durability, and the thermal cycle resistance characteristics were satisfied.

In a case where the amount of La is small, the amount of Sr and the amount of Ca increase, respectively. Sr and Ca are elements having a large linear expansion coefficient, and thus a linear expansion coefficient of the interconnector connecting layer increases. According to this, it can be considered that a stress during the heat cycles increased, and thus peeling-off occurred at a boundary, and as a result, the thermal cycle resistance characteristics were not satisfied. In a case where the amount of La is large, the amount of Sr and the amount of Ca decrease, respectively. Accordingly, the conductivity of the interconnector connecting layer decreases, and cell resistance increases. As a result, the power generation performance does not satisfy the specifications. In addition, in a case where Sr and Ca are not contained at all, sinterability decreases, and thus adhesiveness between the interconnector connecting layer and the air

TABLE 6

| Sample No. | Composition of interconnector connecting layer (number of moles) | | | | | Power generation performance Operation potential (V) | Durability (%/1000 hours) | H/C characteristic (times) |
|---|---|---|---|---|---|---|---|---|
| | La | Sr | Ca | Mn | A/B ratio | | | |
| 24 | 0.4 | 0.3 | 0.3 | 1.02 | 0.98 | 0.77 | 0.025 | 12 |
| 25 | 0.5 | 0.25 | 0.25 | 1.02 | 0.98 | 0.775 | 0.035 | >20 |
| 26 | 0.7 | 0.15 | 0.15 | 1.02 | 0.98 | 0.76 | 0.055 | >20 |
| 27 | 0.9 | 0.05 | 0.05 | 1.02 | 0.98 | 0.75 | 0.08 | >20 |
| 28 | 1 | 0 | 0 | 1.02 | 0.98 | 0.48 | 0.12 | 8 |
| 29 | 0.4 | 0.4 | 0.2 | 1.02 | 0.98 | 0.78 | 0.11 | 10 |
| 30 | 0.95 | 0.02 | 0.03 | 1.02 | 0.98 | 0.74 | 0.1 | >20 |
| 31 | 0.7 | 0.2 | 0.1 | 1.02 | 0.98 | 0.76 | 0.08 | >20 |
| 32 | 0.6 | 0.1 | 0.3 | 1.02 | 0.96 | 0.76 | 0.07 | >20 |
| 33 | 0.5 | 0.5 | 0 | 1.02 | 0.98 | 0.74 | 0.13 | 12 |
| 34 | 0.5 | 0.4 | 0.1 | 1.02 | 0.98 | 0.77 | 0.1 | >20 |
| 35 | 0.5 | 0.1 | 0.4 | 1.02 | 0.98 | 0.76 | 0.11 | >20 |
| 36 | 0.5 | 0 | 0.5 | 1.02 | 0.98 | 0.73 | 0.15 | >20 |

Sample Nos. 24 to 32 are samples in which the amount of La in the material of the interconnector connecting layer was changed in a range of 0.4 moles to 1 moles. In Nos. 24 and 29 in which the amount of La was 0.4 moles, the acceptance criteria of the power generation performance and the durability were satisfied. However, the thermal cycle resistance characteristics were poor, and thus the acceptance criteria were not satisfied. In Nos. 28 and 30 in which the amount of La was large (the amount of La was 1 mole, and 0.95 moles, electrode decreases, and as a result, the thermal cycle resistance characteristics weaken.

From the above-described results, the amount of La in the material of the interconnector connecting layer is defined to be 0.5 moles to 0.9 moles.

Sample Nos. 25, and 33 to 36 are samples in which the amount of Sr and the amount of Ca in the material of the interconnector connecting layer were changed in a range of 0 mole to 0.5 moles. In Sample No. 33 (Sr: 0.5 moles, Ca:

0 mole), the power generation performance, the durability, and the thermal cycle resistance characteristics did not satisfy the acceptance criteria. In Sample No. 36 (Sr: 0 mole, Ca: 0.5 moles), the power generation performance was low, and the durability also did not satisfy the acceptance criteria. On the other hand, Nos. 25, 34, and 35, the acceptance criteria of the power generation performance, the durability, and the thermal cycle resistance characteristics were satisfied.

In a case where the amount of Sr is great, and the amount of Ca is small, evaluation can be considered as follows. A secondary phase is generated, and thus resistance increases. In addition, generation of the second phase also continues during power generation, and thus the resistance increases. In addition, since the linear expansion coefficient is also large, cracking occurs during the heat cycles due to missmatching at the boundary. According to this, it can be considered that the power generation performance, the durability, and the thermal cycle resistance does not satisfy the specifications.

In a case where the amount of Ca is great, and the amount of Sr is small, evaluation can be considered as follows. The second phase is generated, and thus the resistance increases and the power generation performance decreases. In addition, the generation of the second phase also continues during power generation, and thus the resistance increases. As a result, the durability decreases.

From the above-described results, the amount of Sr and the amount of Ca in the material of the interconnector connecting layer are defined to be an amount that is greater than 0 moles, and is less than 0.5 moles.

According to the above-described investigation, in the fuel cell stack including the interconnector connecting layer that is formed from the material expressed by a composition formula of $(La_{1-x-y}Sr_xCa_y)_zMnO_3$-AppmSiO$_2$-DppmMgO through firing, it was confirmed that satisfactory power generation performance, durability, and thermal cycle resistance characteristics are provided. In the composition formula, relationships of $0<x\leq0.4$, $0<y\leq0.4$, $0.1\leq x+y\leq0.5$, and $0.95\leq z<1$ are satisfied, A is 10 to 300, and D is 10 to 400. It is preferable that A is 100 to 300, and D is 100 to 400.

In addition, the structure of the solid oxide fuel cell has been described, but it should be understood by those skilled in the art that the same structure is applicable to a high-temperature water-vapor electrolysis cell that generates hydrogen and oxygen from water vapor. In this case, an electrolysis cell, which generates hydrogen and oxygen from water vapor, is formed by a hydrogen electrode (fuel electrode), a solid oxide electrolyte, and an oxygen electrode (air electrode), and to electrolysis cells adjacent to each other are electrically connected by the interconnector.

DESCRIPTION OF REFERENCE NUMERALS AND SIGNS

101: Cell stack
103: Substrate
105: Fuel cell
107: Interconnector
108: Interconnector connecting layer
109: Fuel electrode
11: Solid oxide electrolyte
113: Air electrode
115: Lead layer
201: Fuel cell module (SOFC module)
203: SOFC cartridge
205: Pressure container
207: Fuel gas supply tube
207a: Fuel gas supply branch tube
209: Fuel gas discharge tube
209a, 209b: Fuel gas discharge branch tube
215: Generating chamber
217: Fuel gas supply chamber
219: Fuel gas discharge chamber
221: Oxidizing gas supply chamber
223: Oxidizing gas discharge chamber
225a: Upper tube plate
225b: Lower tube plate
227a: Upper heat insulating body
227b: Lower heat insulating body
229a: Upper casing
229b: Lower casing
231a: Fuel gas supply hole
231b: Fuel gas discharge hole
233a: Oxidizing gas supply hole
233b: Oxidizing gas discharge hole
235a: Oxidizing gas supply gap
235b: Oxidizing gas discharge gap

The invention claimed is:

1. A fuel cell stack, comprising:
a plurality of fuel cells in which a fuel electrode, a solid oxide electrolyte, and an air electrode are sequentially laminated;
an interconnector that electrically connects the fuel cells which are adjacent to each other; and
an interconnector connecting layer that is interposed directly between the air electrode and the interconnector,
wherein the interconnector connecting layer is formed from a material, which is expressed by a composition formula of $(La_{1-x-y}Sr_xCa_y)_zMnO_3$-A ppm SiO$_2$-D ppm MgO (provided that, $0<x\leq0.4$, $0<y\leq0.4$, $0.1\leq x+y\leq0.5$, $0.95\leq z<1$, A: 10 to 300, D: 10 to 400), through firing.

2. The fuel cell stack according to claim 1,
wherein the interconnector connecting layer is formed from a material, which is expressed by a composition formula of $(La_{1-x-y}Sr_xCa_y)_zMnO_3$-A ppm SiO$_2$-D ppm MgO (provided that, $0<x\leq0.4$, $0<y\leq0.4$, $0.1\leq x+y\leq0.5$, $0.95\leq z<1$, A: 100 to 300, D: 100 to 400), through firing.

3. The fuel cell stack according to claim 1,
wherein a shrinkage ratio when the interconnector connecting layer is fired at 1200° C. for 2 hours is 8% to 25%.

4. The fuel cell stack according to claim 1,
wherein a film thickness of the interconnector connecting layer is set to 3 μm to 20 μm.

5. A fuel cell module, comprising:
the fuel cell stack according to any one of claims 1 to 4.

* * * * *